United States Patent
Cassiers et al.

(10) Patent No.: US 6,850,539 B1
(45) Date of Patent: Feb. 1, 2005

(54) METHOD AND ARRANGEMENTS FOR FAST TRANSITION FROM A LOW POWER STATE TO A FULL POWER STATE IN A COMMUNICATION SYSTEM

(75) Inventors: Raphael Paul Claude Andre Cassiers, Eigenbrakel (BE); Peter Paul Frans Reusens, Laarne (BE); Danny Van Bruyssel, Temse (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/408,264

(22) Filed: Sep. 29, 1999

(30) Foreign Application Priority Data

Sep. 30, 1998 (EP) .............................................. 98402408
Jun. 29, 1999 (EP) .............................................. 99401620

(51) Int. Cl.$^7$ ................................................ H04J 3/22
(52) U.S. Cl. ...................................... 370/465; 713/300
(58) Field of Search ................................ 370/465, 466, 370/467, 493, 395.1, 395.2, 395.21, 395.52, 351, 352, 389, 311, 318, 328, 332, 333, 242; 375/219, 222; 713/300, 320, 323, 324; 455/7, 13.4

(56) References Cited

U.S. PATENT DOCUMENTS

| 5,805,597 | A | * | 9/1998 | Edem | 370/445 |
|---|---|---|---|---|---|
| 5,956,323 | A | * | 9/1999 | Bowie | 370/241 |
| 5,963,650 | A | * | 10/1999 | Simionescu et al. | 705/63 |
| 6,049,885 | A | * | 4/2000 | Gibson et al. | 713/324 |
| 6,167,078 | A | * | 12/2000 | Russo | 375/222 |
| 6,236,674 | B1 | * | 5/2001 | Morelli et al. | 375/219 |
| 6,320,879 | B1 | * | 11/2001 | Bremer | 370/493 |
| 6,434,395 | B1 | * | 8/2002 | Lubin et al. | 455/466 |

FOREIGN PATENT DOCUMENTS

| WO | WO 96/04718 | 2/1996 |
|---|---|---|
| WO | WO 98/19414 | 5/1998 |
| WO | WO 98/36508 | 8/1998 |

OTHER PUBLICATIONS

ITU–Telecommunication Standardization Sector Temporary Document WH–031 Jun. 29, 1998, ITU Study Group 15, ADSL (Asymmetric Digital Subscriber Line) Time Domain Rate Adaptation Based L1 State for G. Lite Modem Power Down Management.

* cited by examiner

*Primary Examiner*—Brian Nguyen
(74) *Attorney, Agent, or Firm*—Sughrue Mion, PLLC

(57) ABSTRACT

In a full power state, data packet are transferred at full power from a transmitter to a receiver, whereas in a low power state data packet s are transferred at low power from the transmitter to the receive. To transit fast from the low power state to the full power state, the transmitter interrupts transmission of the currently transmitted low power data symbol and transmits a copy of the currently transmitted low power symbol at full power to the receiver.

17 Claims, 2 Drawing Sheets

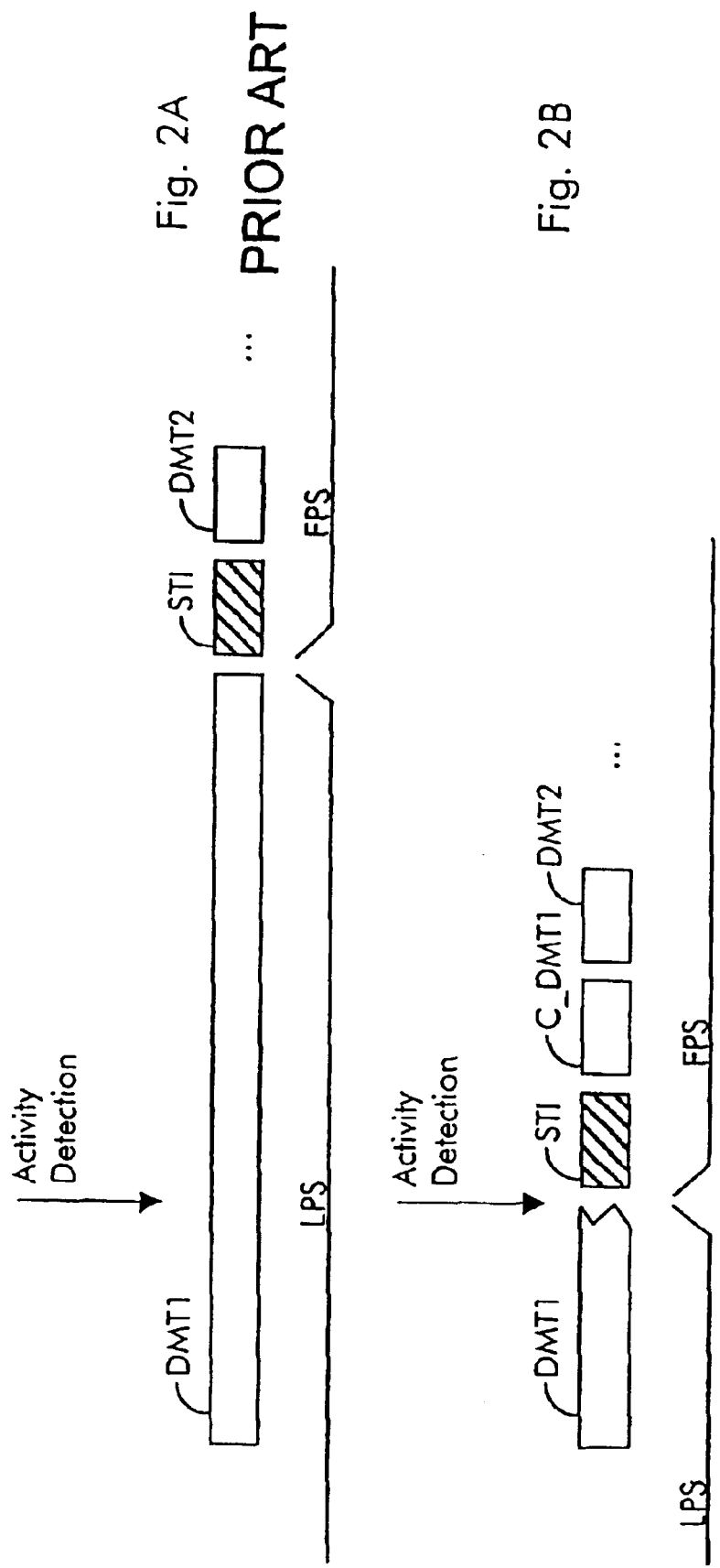

US 6,850,539 B1

METHOD AND ARRANGEMENTS FOR FAST TRANSITION FROM A LOW POWER STATE TO A FULL POWER STATE IN A COMMUNICATION SYSTEM

BACKGROUND OF THE INVENTION

The present invention relates to a method to transit in a communication system from a low power state to a full power state, an arrangement to be used to transit from the low power state to the full power state in a transmitter and an arrangement to transit from the low power state to the full power state in a receiver.

Such a state transition method and arrangement to perform such a state transition are already known in the art, e.g. from the temporary document WH-031 submitted on Jun. 29, 1998 to ITU Study Group 15 which is an ADSL (Asymmetric Digital Subscriber Line) forum. This document with reference WH-031 is entitled 'Time Domain Rate Adaptation Based L1 State for C. Lite Modem Power Down Management' and originates from IteX. In this document, a mechanism for transition between a so called L1 state, a low power/low bit rate state, to a so called L0 state, a full power/full bit rate state, of an ADSL (Asymmetric Digital Subscriber Line) system is described. AS is indicated in paragraph 2 of the cited document, transition between the low power and the full power state is initiated by transfer of a predetermined recognizable state transition indication, called EOC message. Thereafter, the new state is entered at the beginning of the next super-frame. The transition time to switch from the low power state to the full power state is not minimized in the known solution because the actual transition from the low power state to the full power state is delayed until the beginning of the next super-frame. In particular systems such as the known one, wherein data are transferred at a low bit rate during the low power state, the transition time can become significantly large, i.e. several multiples of the time interval required to transfer a super-frame at full power. In communication systems with buffers temporarily storing data, large state transition times imply increased probability for buffer overflow, congestion and even loss of data. If for instance ATM (Asynchronous Transfer Mode) cells have to be transferred over an ADSL (Asymmetric Digital Subscriber Line) network segment, risk of ATM buffer overflow increases if the wake-up time, i.e. the transition time from the low power state to the full power state of the ADSL network segment is large.

SUMMARY OF THE INVENTION

An object of the present invention is to provide a method and arrangement for transition from the low power state to the full power state similar to the known one, but wherein the wake-up time to go from the low power state to the full power state is minimized.

According to the invention, this object is achieved by the method to transit in a communication system from a low power state to a full power state and an arrangement to transit from the low power state to the full power state in a receiver.

Indeed, since the time to transfer the remainder of a data packet in the low power state may succeed several times the time required to transfer a complete data packet in the full power state, the transition time from the low power state to the full power state may be reduced if the low power transmission is abruptly interrupted, and if the remainder of the data pocket currently transferred, is not transmitted at low power. Depending on the remainder of the data packet that still had to be transferred at low power, which is a statistical parameter, and on the difference in transfer time between a full power data packet and a low power data packet, the transition time from the low power state to the full power state will be increased or not. In communication systems wherein the bit rate in the full power state is several multiples of the bit rate in the low power state, the average wake-up time from the low power state to the full power state will be significantly reduced. The incompletely transferred low power data packet for evident reasons can not be used at the receiver's side and consequently it is required to re-send at full power the whole data packet whose transfer has been interrupted.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

An additional feature of the transition method from low power to full power state is that a state transition indication is transferred from the transmitter to the receiver before a copy of the currently transferred data packet is transmitted at full power.

Thus, similar to what happens in the known transition method, the transition from the low power state to the full power state may be announced by sending a predetermined state transition indication from the transmitter to the receiver. The receiver can detect this state transition indication for example by correlation techniques. Alternatively, provided that the receiver is able to discriminate a data packet transmitted at full power from a data packet transmitted at low power, the transition from the low power state to the full power state can be initiated by transmitting a data packet at full power without first transmitting a predetermined state transition indication. The latter alternative requires a more complex receiver equipped with a power measurement device, but enables to even more reduce the transition time from the low power state to the full power state.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein:

FIG. 2 is a data symbol flow diagram illustrating transition from the low power state LPS to the full power state FPS according to the known method in FIG. 2A, and illustrating transition from the low power state LPS to the full power state FPS according to a preferred implementation of the present invention in FIG. 2B.

DETAILED DESCRIPTION OF THE INVENTION

Figure 1:
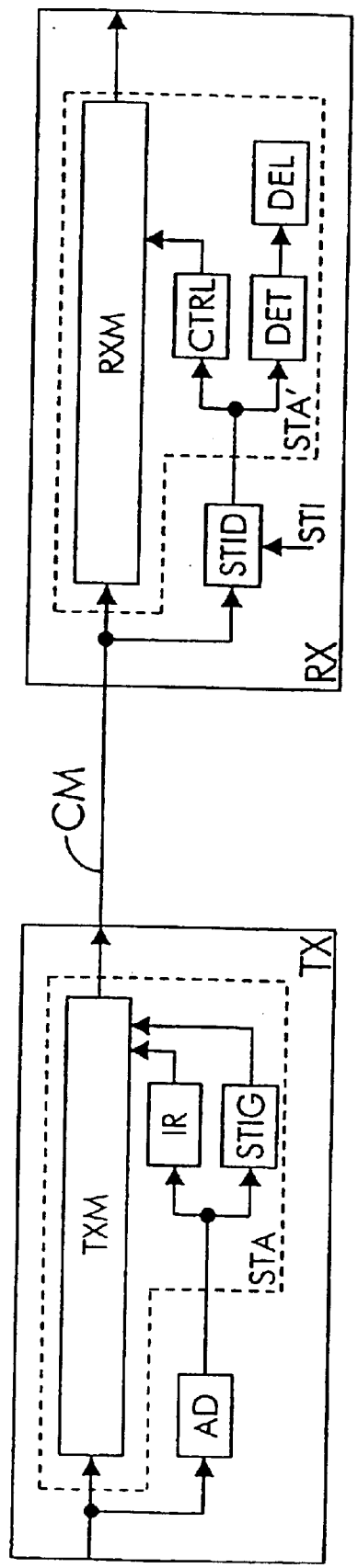
FIG. 1 is a functional block scheme of a communication system with a transmitter TX and receiver RX including state transition arrangements STA and STA' according to the present invention.

The communication system drawn in FIG. 1 contains an ADSL (Asymmetric Digital Subscriber Line) transmitter TX, a twisted pair telephone line CM, and on ADSL receiver RX. The ADSL transmitter includes a activity detector AD and a state transition arrangement STA comprising a DMT (Discrete Multi Tone) transmitter TXM, an interrupting device IR and a state transition indication generator STIG. The ADSL receiver RX includes a state transition indication detector STID and a state transition arrangement STA' comprising a DMT (Discrete Multi Tone) receiver RXM, a control unit CTRL, an interrupted symbol detector DET, and an interrupted symbol deletion device DEL.

In the ADSL transmitter TX, the DMT transmitter TXM is coupled between an input terminal of the ADSL transmitter TX adapted to receive ATM (Asynchronous Transfer Mode) cells and an output terminal of the ADSL transmitter TX adapted to source DMT (Discrete Multi Tone) symbols. The activity detector AD is coupled to the input terminal of the ADSL transmitter TX and is provided with an output terminal coupled respectively to inputs of the interruption device IR and the state transition indication generator STIG. An output of the interruption device IR is connected to a control input of the DMT transmitter TXM whereas an output of the state transition generator STIG is connected to an input terminal of the DMT transmitter TXM.

In the ADSL receiver RX, the DMT receiver RXM is coupled between an input terminal of the ADSL receiver RX adopted to receive DMT (Discrete Multi Tone) symbols and an output terminal of the ADSL receiver RX adopted to source ATM (Asynchronous Transfer Mode) cells. The state transition indication detector STID is coupled to the input terminal of the ADSL receiver RX and is provided with an output terminal coupled respectively to inputs of the control unit CTRL and the interrupted symbol detector DET. An output of the lotter interrupted symbol defector DET is connected to an input terminal of the interrupted symbol deletion device DEL, whereas an output of the control unit is connected to a control input of the DMT receiver RXM. The twisted pair telephone line CM is coupled between the output terminal of the ADSL transmitter TX and the input terminal of the ADSL receiver RX.

Although an ADSL (Asymmetric Digital Subscriber Line) system bi-directionally transfers digital data in overlay of telephone signals between a central office and remote terminal, the communication system in FIG. 1 shows transfer of data in only one direction, i.e. from the central office to the remote terminal or from the remote terminal to the central office. This uni-directional communication system nevertheless is supposed to operate in accordance with the ADSL principles: incoming data like for instance ATM (Asynchronous Transfer Mode) cells or IP 5Internet Protocol) packets are encapsulated in DMT (Discrete Multi Tone) symbols by the DMT transmitter TXM, whose working is based on an inverse Fourier transformer, and transmitted over the telephone line CM. At the receiver's side, the DMT symbols are de-capsulated by the DMT receiver RXM, whose working is based on a Fourier transformer, and the so generated ATM cells or IP packets are sourced. In case the ATM cells or IP packets at the entrance of the ADSL transmitter TX are not idle, the ADSL transmitter TX and ADSL receiver RX operate in a full power mode wherein the DMT symbols are transferred at high bit rate over the telephone line CM. In case the ATM cells or IP packets at the entrance of the ADSL receiver TX are idle, the ADSL transmitter TX and ADSL receiver RX operate in a low power mode wherein the DMT symbols are transferred at low bit rate over the telephone line CM. In the low power mode, power consumption of the ADSL transmitter TX and ADSL receiver RX is significantly reduced compared to the full power mode.

When the transmitter is in the low power mode, the activity detector AD monitors the entrance of the ADSL transmitter TX for non-idle ATM cells. As soon as the activity detector detects non-idle ATM cells at the input, the state transition indication generator STIG and the interruption device IR are triggered via control signals. The state transition indication generator STIG generates a message with a predetermined contents and applies this message to the DMT transmitter TXM. The interruption means controls the DMT transmitter TXM to interrupt transmitting the low power DMT symbol DMT1 it is transmitting at that moment. As soon as transfer of the currently transferred low power DMT symbol DMT1 has been interrupted, the DMT transmitter TXM sends the predetermined message, the so called state transition indication STI, generated by the state transition indication generator STIG over the telephone line CM. Afterwards, the DMT transmitter TXM sends a copy C_DMT2 of the DMT symbol DMT1 whose transfer has been interrupted upon instruction of the interruption device IR. This copy C_DMT1 is no longer transmitted at low power but is transmitted at full power/full bit rate. The ADSL transmitter TXM has entered the full power state and will remain transmitting subsequent DMT symbols DMT2 at full power/full bit rate until idle ATM cells are applied to its input. The transition from the low power state LPS to the full power state FPS upon detection of non-idle ATM cells (Activity Detection) at the transmitter's entrance, whereby low power transfer of a DMT symbol DMT1 is interrupted and followed by full power transmission of the state transition indication STI, the copy C_DMT1 of the interrupted DMT symbol DMT1 and subsequent non-idle DMT symbols DMT2 is illustrated by FIG. 2B.

In the ADSL receiver RX, the state transition indication detector STID monitors the entrance of the ADSL receiver RX when this ADSL receiver RX operates in the low power state. The state transition indication detector STID for example uses correlation techniques to recognize the predetermined state from the low power state LPS to the full power state FPS. As soon as the state transition indication detector DET recognizes the state transition indication STI, it activates the control unit CTRL and the interrupted symbol detector DET via control signals. The interrupted symbol detector DET detects the incompletely transmitted DMT symbol DMT1 that will be deleted by the interrupted symbol deletion device DEL, the control unit CTRL instructs the DMT receiver RXM to enter the full power state FP5 wherein it is able to receive subsequent DMT symbols C_DMT1, DMT2 at full power/full bit rate.

It is remarked that the functionality of the interrupted symbol detector DET and the interrupted symbol deletion device DEL may in an alternative embodiment of the present invention be integrated with the DMT receiver RXM into a single device. Indeed, the detection and deletion of incompletely transferred DMT symbols may be realized in hardware or in software and evidently can be integrated in the DMT receiver RXM.

It is also noticed that in an alternative version of the current invention, the average transition time from the low power state LPS to the full power state FPS is even more reduced by interrupting transmission of the currently transferred low power DMT symbol DMT1 only if that part of the DMT symbol DMT1 that has already been transmitted has not yet exceeded a certain threshold. Thus, the symbol DMT1 can be transferred at low power. This implementation of the present invention minimizes the average wake-up time to go from the low power state LPS to the full power state FPS at the cost of some additional complexity in the ADSL transmitter TX to determine the portion of the DMT symbol DMT1 that already has been transferred and to compare this portion with a certain threshold.

Furthermore, it is remarked that the activity detector AD may be able to check whether incoming data is idle or not, similar to the above described activity detector AD, but alternatively may just be able to interpret a control signal received from equipment interfacing the ADSL transmitter TX. This control signal may indicate that the data applied to the input terminal of the ADSL transmitter TX are idle or that no data at all are applied to the input terminal of the ADSL transmitter TX so that the low power state may be entered.

Although it has been mentioned in the introductory part of this patent application, it is emphasized here that to implement the basic idea of the present invention, i.e. interrupting low power transmission of the currently transferred DMT symbol and full power transmission of a copy C_DMT1 of the interrupted DMT symbol DMT1, it is to required to generate, transfer and detect a state transition indication STI. Such a state transition indication STI helps the receiver RX detect the moment whereon it has to transit from the low power state LPS to the full power state FPW, but must for example not be sent in a system wherein the receiver RX is able to detect the difference between a low power DMT symbol DMT1 and a full power DMT symbol DMT2 and is able to autonomously switch from the low power mode LPS to the full power mode FPS thereupon.

Also a remark is that various ways to implement the interrupted symbol deletion device DEL can be thought of. The bits of an interrupted DMT symbol can for example be taken from the line by a kind of switch. Alternatively, the bits can be made idle or zero.

Yet another remark is that the applicability of the invention is not reduced to telecommunication systems with a particular physical transmission medium or wherein any particular physical layer transmission protocol is used. The invention in other words can be applied in any packet or symbol based transmission system, irrespective of the fact whether the packets or symbols are sent over twisted pair cables, coaxial cables, optical fibres, radio links, satellite links, or the like, and irrespective of the physical layer protocol (e.g. ADSL—Asymmetric Digital Subscriber Line) that is used to represent the bits on the transmission link.

Furthermore, it is remarked that an embodiment of the present invention is described above in terms of functional blocks. From the functional description of these blocks it will be obvious for a person skilled in the art of designing electronic devices how embodiments of these blocks can be manufactured with well-known electronic components. A detailed architecture of the contents of the functional blocks hence is not given.

What is claimed is:

1. A method for transitioning a communication system from a low power state to a high power state, said method comprising:
   receiving an idle data packet at a transmitter,
   transmitting the idle data packet from the transmitter to a receiver at a low bit rate at low power,
   receiving an active data packet for transmission at the transmitter,
   determining if the transmission of the idle data packet must be interrupted, and
   if the determination is positive, interrupting the transmission of the idle data packet and transmitting a copy of the interrupted idle data packet at a high bit rate at high power prior to transmitting the active data packet at a high bit rate at high power.

2. The method according to claim 1, wherein a state transition indication is transferred from the transmitter to a receiver before the copy of the interrupted idle data packet is transmitted at high power.

3. The method for transitioning as claimed in claim 1, wherein the determination is positive if an already-transmitted portion of the interrupted idle data packet does not exceed a predetermined threshold.

4. The method for transitioning as claimed in claim 1, wherein the determination is positive if a complete copy of the interrupted idle data packet can be transmitted in less time than the remaining un-transmitted portion of the interrupted idle data packet.

5. A state transition arrangement comprising:
   a transmitter adapted to transmit received idle data packets at a low bit rate at low power;
   interruption means for interrupting transmission of an idle data packet currently being transferred, said interruption means determining if the transmission of the idle data packet must be interrupted when an active data packet enters the transmitter, and
   re-transmission means for transmitting a copy of the interrupted idle data packet at a high bit rate at high power prior to transmitting the active data packet at a high bit rate at high power, wherein the re-transmission means transmits the copy of the interrupted idle data packet if the interruption means determines that the transmission of the idle packet must be interrupted.

6. The state transition arrangement as claimed in claim 5, further comprising state transition generator that generates a state transition indication to be transferred from the transmitter to a receiver before the copy of the interrupted idle data packet is transmitted at high power.

7. The state transition arrangement as claimed in claim 5, wherein the re-transmission means transmits the copy of the interrupted idle data packet if an already-transmitted portion of the interrupted idle data packet does not exceed a predetermined threshold.

8. The state transition arrangement as claimed in claim 5, wherein the re-transmission means transmits the copy of the interrupted idle data packet if a complete copy of the interrupted idle data packet can be transmitted in less time than the remaining un-transmitted portion of the interrupted idle data packet.

9. The state transition arrangement as claimed in claim 5, further comprising an activity detector that detects active data packets being received at the transmitter.

10. A state transmission arrangement comprising:
    a transmitter adapted to transmit received idle data packets at a low bit rate at low power, wherein the transmitter further comprises:
       interruption means for interrupting transmission of an idle data packet currently being transferred, said interruption means determining if the transmission of the idle data packet must be interrupted when an active data packet enters the transmitter, and
       re-transmission means for transmitting a copy of the interrupted idle data packet at a high bit rate at high power prior to transmitting the active data packet at a high bit rate at high power, wherein the re-transmission means transmits the copy of the interrupted idle data packet if the interruption means determines that the transmission of the idle packet must be interrupted; and a receiver that receives idle data packets at a low bit rate at low power and receives active data packets at a high bit rate at high power;

detection means for detecting an idle data packet that is interrupted while being transmitted at low power, and deletion means, coupled to said detection means for receiving a copy of said interrupted idle data packet transmitted at high power.

11. The state transition arrangement as claimed in claim 10, further comprising state transition generator that generates a state transition indication to be transferred from the transmitter to a receiver before the copy of the interrupted idle data packet is transmitted at high power.

12. The state transition arrangement as claimed in claim 10, wherein the re-transmission means transmits the copy of the interrupted idle data packet if an already-transmitted portion of the interrupted idle data packet does not exceed a predetermined threshold.

13. The state transition arrangement as claimed in claim 10, wherein the re-transmission means transmits the copy of the interrupted idle data packet if a complete copy of the interrupted idle data packet can be transmitted in less time than the remaining un-transmitted portion of the interrupted idle data packet.

14. The state transition arrangement as claimed in claim 10, further comprising an activity detector that detects active data packets being received at the transmitter.

15. The state transition arrangement as claimed in claim 10, wherein the receiver is adapted to detect a difference between a symbol transmitted at low power and a symbol transmitted at high power.

16. A state transition arrangement comprising:

a transmitter adapted to transmit received idle data packets at a low bit rate at low power;

an interruption device that interrupts transmission of an idle data packet currently being transferred, wherein said interruption device determines if the transmission of the idle data packet must be interrupted when an active data packet enters the transmitter, and wherein said transmitter transmits a copy of the interrupted idle data packet at a high bit rate at high power prior to transmitting the active data packet at a high bit rate at high power if the interruption device determines that the transmission of the idle packet must be interrupted.

17. A state transmission arrangement comprising:

a transmitter adapted to transmit received idle data packets at a low bit rate at low power, wherein the transmitter further comprises:

an interruption device that interrupts transmission of an idle data packet currently being transferred, wherein said interruption device determines if the transmission of the idle data packet must be interrupted when an active data packet enters the transmitter, and wherein said transmitter transmits a copy of the interrupted idle data packet at a high bit rate at high power prior to transmitting the active data packet at a high bit rate at high power if the interruption device determines that the transmission of the idle packet must be interrupted; and a receiver that receives idle data packets at a low bit rate at low power and receives active data packets at a high bit rate at high power;

an interrupted symbol detector for detecting an idle data packet that is interrupted while being transmitted at low power, and an interrupted symbol deletion device, coupled to said interrupted symbol detector for receiving a copy of said interrupted idle data packet transmitted at high power.

* * * * *